(12) United States Patent
Murray et al.

(10) Patent No.: US 8,152,200 B2
(45) Date of Patent: Apr. 10, 2012

(54) HEAVY EQUIPMENT TRAILER WITH DECK EXTENSION

(75) Inventors: Douglas Glen Murray, Lodi, CA (US); David Lee Trowbridge, Lodi, CA (US)

(73) Assignee: Harley Murray, Inc., Stockton, CA (US)

( * ) Notice: Subject to any disclaimer, the term of this patent is extended or adjusted under 35 U.S.C. 154(b) by 380 days.

(21) Appl. No.: 12/489,919

(22) Filed: Jun. 23, 2009

(65) Prior Publication Data

US 2010/0320792 A1 Dec. 23, 2010

(51) Int. Cl.
*B62D 21/00* (2006.01)
*B62D 53/06* (2006.01)

(52) U.S. Cl. .......... 280/789; 280/149.2; 280/423.1; 280/785; 280/800; 296/26.09

(58) Field of Classification Search ........ 280/423.1, 280/441.2, 781, 785, 789, 797, 798, 799, 280/800, 142, 656, 418.1; 296/26.08, 26.09, 296/184.1; 414/481
See application file for complete search history.

(56) References Cited

U.S. PATENT DOCUMENTS

| | | | |
|---|---|---|---|
| 3,163,306 A * | 12/1964 | Bennett et al. | 414/498 |
| 3,326,572 A | 6/1967 | Murray | |
| 3,508,762 A * | 4/1970 | Pratt | 280/81.1 |
| 3,556,545 A * | 1/1971 | Van Raden | 280/656 |
| 3,722,948 A * | 3/1973 | Walsh et al. | 296/35.3 |
| 4,262,923 A * | 4/1981 | Weir | 280/415.1 |
| 4,877,293 A * | 10/1989 | French et al. | 298/17 R |
| 4,958,845 A * | 9/1990 | Parks | 280/407.1 |
| 5,522,685 A * | 6/1996 | Lessard | 410/121 |
| 5,794,960 A * | 8/1998 | Sill et al. | 280/441.2 |
| 7,121,586 B2 * | 10/2006 | McNally | 280/797 |
| 7,255,370 B2 * | 8/2007 | Lin | 280/785 |
| 7,287,947 B2 * | 10/2007 | Smith | 414/481 |
| 7,677,625 B2 * | 3/2010 | Gosselin et al. | 296/26.09 |
| 7,722,104 B2 * | 5/2010 | Nichols | 296/26.08 |
| 7,845,700 B2 * | 12/2010 | Gosselin et al. | 296/26.1 |

OTHER PUBLICATIONS

Definition of "Along" at Dictionary.Com, available at, http://dictionary.reference.com/browse/along?r=66 (last visited on Aug. 23, 2011)(along: through, on, beside, over, or parallel to the length or direction of; from one end to the other of: to walk along a highway; to run a border along a shelf.).*

* cited by examiner

*Primary Examiner* — Joseph Rocca
(74) *Attorney, Agent, or Firm* — Edward S. Wright

(57) ABSTRACT

Heavy equipment trailer and deck extension. The trailer has an elongated main deck with longitudinally extending frame members on opposite sides thereof, and ground engaging wheels toward the rear of the main deck. The extension has longitudinally extending frame members aligned with the frame members of the main deck, and coupling pins extend between the frame members of the main deck and the extension in load supporting relationship, with lock pins preventing longitudinal separation of the main deck and the extension. C-shaped channel members extend along the upper, lower, and outer sides of the extension, past the coupling pins, and along upper, lower, and outer side portions of the frame members of the main deck to hold the frame members in alignment and prevent sagging under load conditions.

22 Claims, 3 Drawing Sheets

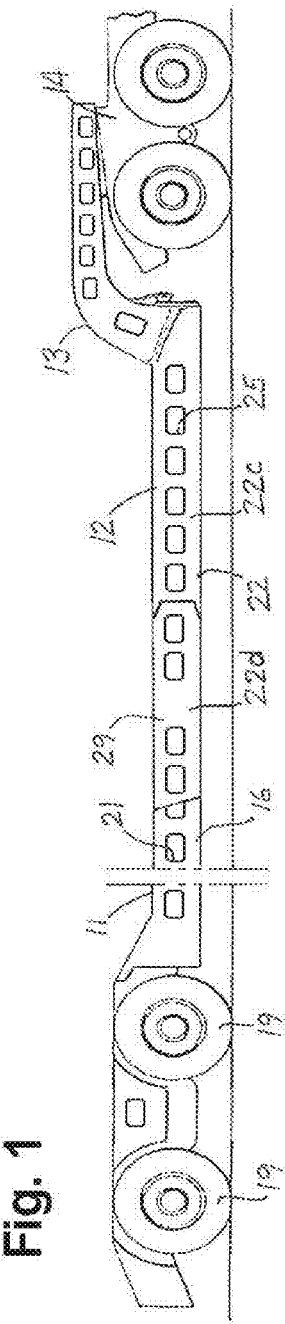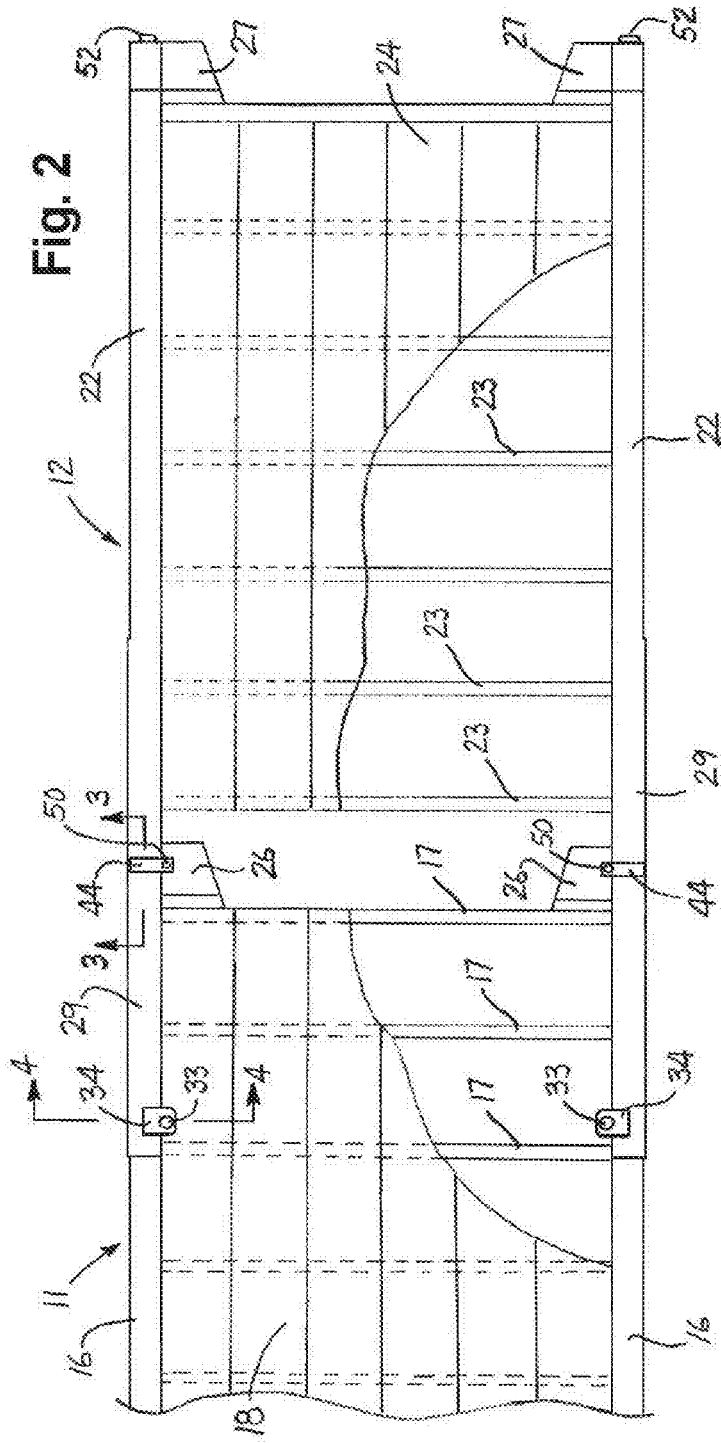

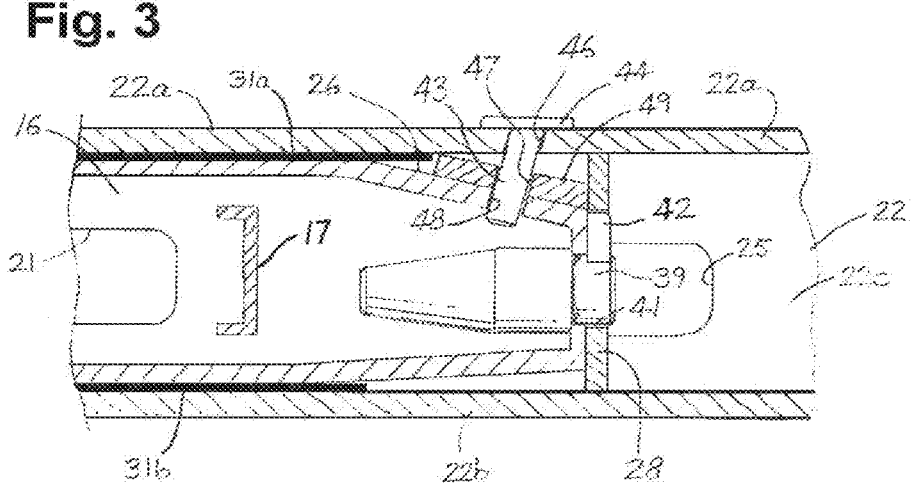
Fig. 3
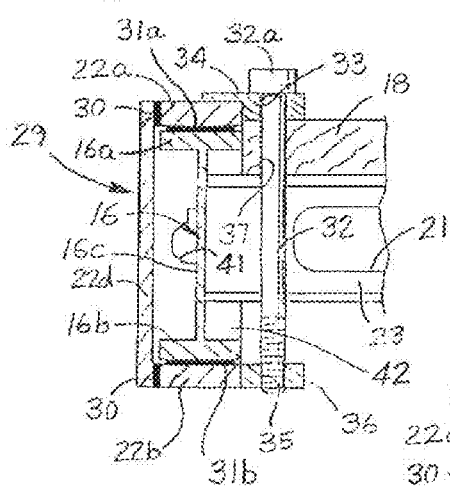
Fig. 4
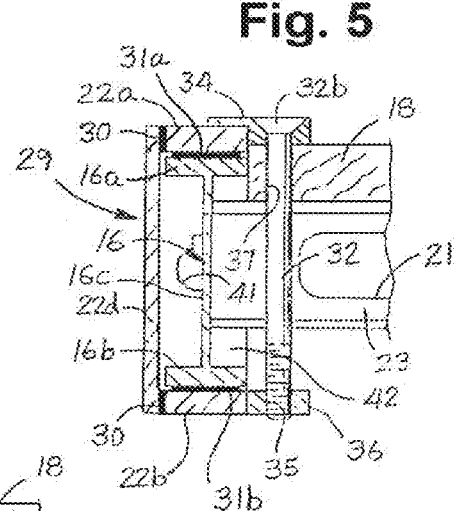
Fig. 5
Fig. 6

HEAVY EQUIPMENT TRAILER WITH DECK EXTENSION

BACKGROUND OF THE INVENTION

1. Field of Invention

This invention pertains generally to trailers for carrying large, heavy loads and, more particularly, to a trailer with a detachable deck extension for carrying such loads.

2. Related Art

Trailers for transporting construction equipment and other large, heavy loads typically have elongated decks supported toward the rear by ground engaging wheels, with means toward the fronts of the decks for connecting the trailers to tractors or other pulling vehicles. In some instances, the connection is made with a gooseneck which can be detached from the deck to allow the equipment to be loaded onto the deck from the front. One example of a trailer with a detachable gooseneck is found in U.S. Pat. No. 3,326,572.

Heretofore, there have been some attempts to extend the length of such trailers by the use of a deck extension between the existing deck and the gooseneck. In order to support the weight of the load without sagging, such extensions have required the use of relatively large, heavy beams which can project as much as six inches or more above the other frame members or deck and interfere with the loading and unloading of the equipment onto and off of the deck.

OBJECTS AND SUMMARY OF THE INVENTION

It is, in general, an object of the invention to provide a new and improved trailer with a detachable deck extension for carrying large, heavy loads.

Another object of the invention is to provide a trailer and extension of the above character which overcome the limitations and disadvantages of the trailers and extensions heretofore provided.

These and other objects are achieved in accordance with the invention by providing a trailer and deck extension wherein the trailer has an elongated main deck with longitudinally extending frame members on opposite sides thereof, and ground engaging wheels toward the rear of the main deck. The extension has longitudinally extending frame members aligned with the frame members of the main deck, and coupling pins extend between the frame members of the main deck and the extension in load supporting relationship, with lock pins preventing longitudinal separation of the main deck and the extension. C-shaped channel members extend along the upper, lower, and outer sides of the extension, past the coupling pins, and along upper, lower, and outer side portions of the frame members of the main deck to hold the frame members in alignment and prevent sagging under load conditions.

BRIEF DESCRIPTION OF THE DRAWINGS

FIG. 1 is a side elevational view of one embodiment of a heavy equipment trailer with a deck extension according to the invention.

FIG. 2 is a fragmentary top plan view, partly broken away, of the embodiment of FIG. 1.

FIG. 3 is a cross-sectional view taken along line 3-3 in FIG. 2.

FIG. 4 is a cross-sectional view taken along line 4-4 in FIG. 2.

FIGS. 5 and 6 are cross-sectional views similar to FIG. 4, illustrating additional fasteners for use in the embodiment of FIG. 1.

DETAILED DESCRIPTION

Figure 7:
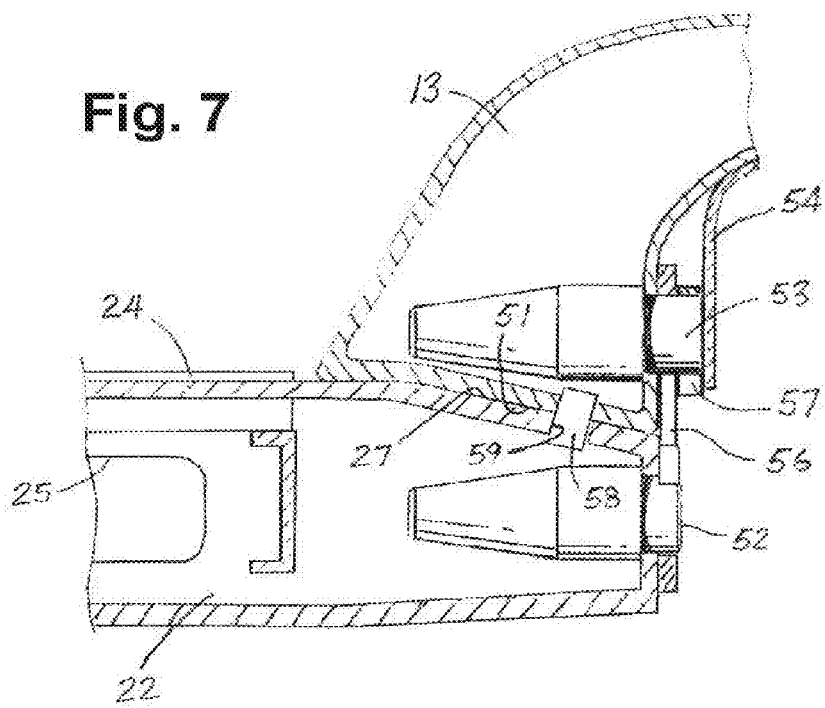
FIG. 7 is a fragmentary vertical sectional view of the embodiment of FIG. 1, with the gooseneck attached to the deck extension.

As illustrated in FIG. 1, the trailer includes an elongated main deck 11, a deck extension 12 at the forward end of the main deck, and a gooseneck 13 at the forward end of the extension for connecting the trailer to the fifth wheel of a tractor or other suitable pulling vehicle 14. As discussed more fully hereinafter, the extension is detachably connected to the main deck, and the gooseneck is detachably connected to the extension. When the extension is not needed, it can be removed, with the gooseneck then being connected directly to the forward end of the main deck.

The main deck has longitudinally extending frame members 16 on opposite sides thereof, with cross members 17 extending transversely between the frame members, and decking 18 supported by the cross members. In the embodiment illustrated, frame members 16 are I-beams with upper and lower flanges 16a, 16b, and webs 16c between the flanges. Cross members 17 consist primarily of I-beams, and the decking is wood. The rear portion of the main deck is supported in a conventional manner by ground engaging wheels 19, with cutouts 21 in the web portions of the I-beams to reduce the weight of the trailer. Alternatively, if desired, the decking can be made of materials other than wood or omitted entirely, and other load carrying structures such as rails for receiving flanged wheels of railroad equipment can also be mounted to the cross members.

The deck extension has longitudinally extending frame members 22 aligned with the frame members 16 of the main deck, with cross members 23 extending transversely between frame members 22, and decking 24 supported by cross members 23. Frame members 22 include upper and lower flanges or rails 22a, 22b, which extend substantially the entire length of the extension, with webs 22c extending along the longitudinal center lines of the flanges to form I-beams with the webs. Cross members 23 consist primarily of I-beams, decking 24 is wood, and cutouts 25 are formed in the web portions of the frame members and the cross members.

The front portions of the frame members of both the main deck section and the extension section have downwardly and forwardly inclined mounting surfaces 26, 27 which are engaged by the gooseneck when the gooseneck is attached to respective ones of the deck sections.

Webs 22c extend only to the rear of decking 24 where they abut against vertically extending blocks 28. Side walls or webs 22d extend along the outer sides of flanges 22a, 22b from about 4 feet in front of the blocks to the rear ends of the flanges about 5-6 feet beyond the blocks. The portions of webs 22d and flanges 22a, 22b to the rear of the blocks form C-shaped channel members 29 which extend along and embrace the upper, lower, and outer sides of the frame members 16 of the main deck and prevent sagging in the connection between the main deck and the extension under load conditions. Spacers 30 are disposed between the outer edges of flanges 22a, 22b and webs 22d to provide lateral clearance between the channel members and the sides of the main deck, with pads 31a, 31b on the lower sides of flanges 22a and the upper sides of flanges 22b in sliding engagement with the upper and lower sides frame members of the main deck.

Webs 22c are welded to flanges 22a, 22b, webs 22d and spacers 30 are welded to flanges 22a, 22b, and blocks 28 are welded to flanges 22a, 22b and to the end portions of webs 22c and to webs 22d, with the front end portions of webs 22d being tapered, bent inwardly, and welded to webs 22c to form a rigid, unitary structure.

Flanges 22a, 22b are connected together by bolts 32 toward the rear of the channel members to prevent twisting of the channel members under load. These bolts pass through openings 33 in tabs 34 affixed to the upper flanges and are threadedly received in openings 35 in tabs 36 affixed to the lower flanges. They also pass through holes 37 in decking 18. The bolts can have standard heads 32a as illustrated in FIG. 4, or they can have flat heads 32b as illustrated in FIG. 5. The bolt heads can also be positioned below the upper surfaces of the flanges by the use of offset tabs 34 as illustrated in FIG. 6.

The frame members of the main deck and the extension are joined together in load supporting relationship by longitudinally extending coupling pins 39 which project in a forward direction from the front ends of main deck frame members 16 and are received in sockets 41 in blocks 28. The sockets extend through the blocks and open into cutouts 25 at the ends of webs 22c, with the tip portions of the coupling pins extending into the cutouts. Generally rectangular support blocks 42 are welded to the upper sides of pins 39 and to frame members 16 to reinforce the pins under load conditions, and the rear portions of the pins are tapered to reduce weight.

Lock pins 43 hold the main deck and the extension together in a manner preventing longitudinal separation of the two, thereby ensuring that coupling pins 39 remain firmly seated in sockets 41. The lock pins depend from bases 44 and pass through aligned openings 46, 47, and 48 in the flanges, in blocks 49 affixed to the channel members, and in the inclined surfaces 26 at the front ends of frame members 16. Blocks 49 are spaced above the inclined surfaces and are affixed to the under sides of the upper flanges of the channel members and to coupling blocks 28, with the lower surfaces of blocks 49 generally parallel to the inclined surfaces, and the pins extending in a direction generally perpendicular to those surfaces. The lock pins are retained in place by screws 50 which extend through the bases and are threadedly received in tabs (not shown) welded to the inner edges of upper flanges 22a.

Gooseneck 13 has downwardly and forwardly inclined mounting surfaces 51 which mate with the mounting surfaces 26, 27 of frame members 16, 22 when the gooseneck is attached to the main deck or to the extension. Coupling pins 39 are also utilized in attaching the gooseneck to the main deck, and similar coupling pins 52 project from the forward ends of frame members 22 for use in attaching the gooseneck to the extension. Additional coupling pins 53 extend from the gooseneck in a direction generally parallel to coupling pins 39, 52, with the outer ends of pins 53 being further supported by straps 54. The gooseneck and the frame members are held together with the mounting surfaces in abutting engagement by coupling links 56 which encircle the pins.

The coupling pins on the gooseneck extend farther forward than the pins on the frame members, and the coupling links are movable between forward and aft positions on the gooseneck pins. In the aft position, the links engage both the pins on the gooseneck and the pins on the frame members and connect the gooseneck and frame members together. In the forward position, the links engage only the outer portions of the gooseneck pins, and the gooseneck is disconnected from the frame members. The links are held in the forward and aft positions by U-shaped collars or spacers 57 which can be positioned on gooseneck pins 53 on the forward sides of the links when the links are in the aft position and on the aft sides of the links when the links are in the forward position.

Additional longitudinal and lateral stability in the coupling between the gooseneck and the frame members is provided by rectangular lugs or teeth 58 which extend from mounting surfaces 51 and are received in openings or sockets 48, 59 in mounting surfaces 26, 27, respectively.

To attach the extension to the main deck, the gooseneck is removed, and the front end of the deck is raised to an elevated position. The extension is then positioned with its frame members 22 in alignment with the frame members 16 of the main deck and moved toward the main deck, with the front portions of the frame members of the main deck being slidably received in the portions of the channel members 29 which extend rearwardly from the decking of the extension and coupling pins 39 being slidably received in sockets 41. When the coupling pins are fully seated in the sockets, lock pins 43 are inserted into their openings and secured with screws 50, and bolts 32 are installed to hold the flanges of the channel members together and prevent the channel members from twisting under load.

The gooseneck is then attached to the front of the deck extension, as illustrated in FIG. 7, by bringing the mounting surfaces 51 of the gooseneck into engagement with the mounting surfaces 27 of the extension, with coupling links 56 in their forward position and stabilizing lugs 58 being received in openings 59. Once the surfaces are together, the links are slid back along pins 53 and onto pins 52, then secured in the aft position by placing spacers 57 on pins 53 on the front sides of the links.

Figure 8:
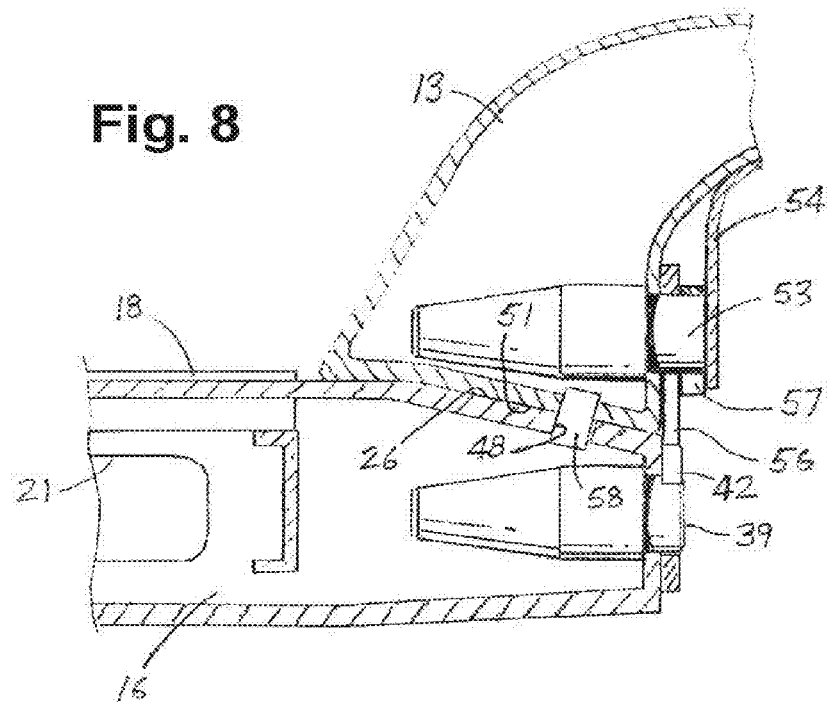
FIG. 8 is a fragmentary vertical sectional view of the embodiment of FIG. 1, with the gooseneck attached to the main deck of the trailer.

To remove the deck extension and connect the gooseneck directly to the main deck, as illustrated in FIG. 8, the gooseneck is first detached from the extension by resting the front end of the extension on the ground or another suitable supporting surface, removing spacers 57 from pins 53, sliding links 56 in a forward direction along pins 53 to disengage them from pins 52, and then lifting the gooseneck away from the extension, e.g. with the tractor or other pulling vehicle. The extension is then disconnected from the main deck by removing lock pins 43 and bolts 32 and sliding the extension in a forward direction to disengage coupling pins 39 from their sockets and channel members 29 from frame members 16, with the front end of the deck in an elevated position. Once the extension has been removed, the front end of the deck is lowered, and the gooseneck is attached to it by bringing mounting surfaces 51 into engagement with mounting surfaces 26, with stabilizing lugs 58 being received in openings 48. Coupling links 56 are then slid rearwardly along pins 53 onto pins 39 and secured in their aft positions by placing spacers 57 on the front sides of the links.

The invention has a number of important features and advantages. The deck extension is easy to install and remove, and the C-shaped channel members provide a strong, stable connection between the extension and the main deck of the trailer. Moreover, the flanges of the channel members are only about one inch thick and do not extend above the decking and interfere with the loading and unloading of the trailer.

It is apparent from the foregoing that a new and improved heavy equipment trailer with a detachable deck extension has been provided. While only certain presently preferred embodiments have been described in detail, as will be apparent to those familiar with the art, certain changes and modifications can be made without departing from the scope of the invention as defined by the following claims.

The invention claimed is:

1. A trailer with a deck extension, comprising:
an elongated main deck having longitudinally extending frame members on opposite sides thereof,
ground engaging wheels toward the rear of the main deck,
a deck extension having longitudinally extending frame members aligned with the frame members of the main deck,
coupling pins extending longitudinally between the frame members of the main deck and the extension in load supporting relationship,
lock pins preventing longitudinal separation of the main deck and the extension, and
C-shaped channel members extending rearwardly from the longitudinally extending frame members of the extension and along upper, lower, and outer side portions of the frame members of the main deck to hold the frame members of the main deck and the extension in alignment and prevent sagging under load conditions.

2. The trailer of claim 1 wherein the C-shaped channel members are an integral part of the extension, and front portions of the frame members of the main deck are slidably received in the C-shaped channel members.

3. The trailer of claim 2 wherein the C-shaped channel members include have side walls with upper and lower flanges extending laterally therefrom and fasteners interconnecting free edge portions of the upper and lower flanges toward the rear of the channel members to prevent twisting of the C-shaped channel members under load conditions.

4. The trailer of claim 1 wherein the lock pins pass through openings in the C-shaped channel members and in the frame members of the main deck.

5. The trailer of claim 1 further comprising a detachable gooseneck which can be attached either to the front of the extension or to the front of the main deck when the extension is not in use.

6. A trailer with a deck extension, comprising:
an elongated main deck having longitudinally extending frame members on opposite sides thereof,
ground engaging wheels toward the rear of the main deck,
a deck extension having longitudinally extending frame members aligned with the frame members of the main deck,
C-shaped channel members extending rearwardly from the longitudinally extending frame members of the extension and along upper, lower, and outer side portions of the frame members of the main deck to hold the frame members of the main deck and the extension in alignment and prevent sagging under load conditions,
coupling pins which project in a forward direction from the frame members of the main deck and are slidably received in sockets in blocks which extend between and are affixed to upper and lower flanges of the C-shaped channel members, and
lock pins preventing longitudinal separation of the main deck and the extension.

7. A deck extension for a trailer having an elongated deck with longitudinally extending frame members on opposite sides thereof, ground engaging wheels toward the rear of the deck, and coupling pins extending in a forward direction from the frame members, comprising:
longitudinally extending frame members aligned with the frame members of the trailer deck,
C-shaped channel members extending rearwardly from the frame members of the extension having longitudinally extending side walls with upper and lower flanges extending laterally from the side walls for embracing the frame members of the trailer deck,
blocks extending between and affixed to the upper and lower flanges of the C-shaped channel members with sockets in the blocks for receiving the coupling pins in load supporting relationship, and
lock pins engagable with the frame members of the trailer deck to prevent longitudinal separation of the deck and the extension.

8. The deck extension of claim 7 wherein the frame members of the extension include webs which extend longitudinally along the center lines of the flanges between the front of the extension and the blocks, and the C-shaped channel members include webs which extend along the outer sides of the flanges to the rear of the blocks.

9. The deck extension of claim 7 including blocks with downwardly and forwardly inclined lower surfaces extending between the upper flanges of the C-shaped channel members and the first named blocks, with openings in the inclined blocks for registration with corresponding openings in inclined portions of the frame members of the trailer deck for receiving the lock pins.

10. The deck extension of claim 7 including bolts interconnecting the upper and lower flanges toward the rear of the C-shaped channel members to prevent twisting of the C-shaped channel members under load.

11. The deck extension of claim 7 including coupling pins similar to the coupling pins on the trailer deck projecting from the forward ends of the frame members of the extension for connection to a gooseneck.

12. A trailer with a deck extension, comprising:
an elongated main deck having longitudinally extending frame members with downwardly and forwardly inclined mounting surfaces at the forward ends of the frame members,
ground engaging wheels toward the rear of the frame members,
a deck extension having longitudinally extending frame members aligned with the frame members of the main deck,
coupling pins which project from the forward ends of the frame members of the main deck and are received in load supporting relationship in sockets in the extension,
lock pins preventing longitudinal separation of the main deck and the extension,
C-shaped channel members extending rearwardly from the longitudinally extending frame members of the extension and along upper, lower, and outer side portions of the frame members of the main deck to hold the frame members in alignment and prevent sagging under load conditions,
downwardly and forwardly inclined mounting surfaces and coupling pins at the forward ends of the frame members of the extension,
a gooseneck having inclined surfaces in abutting engagement with the mounting surfaces at the forward ends of the frame members of the extensions and coupling pins which are generally parallel to the coupling pins at the forward ends of the frame members of the extension, and
coupling links engaging the coupling pins on the extension and the gooseneck in load supporting relationship.

13. The trailer of claim 12 wherein the inclined surfaces and the coupling pins at the forward end of the main deck are similar to the inclined surfaces and the coupling pins at the forward end of the extension, and the gooseneck can be connected directly to the main deck when the extension is not present, with the inclined surfaces of the gooseneck in abutting engagement with the inclined surfaces at the forward end of the main deck, and the coupling links engaging the coupling pins on the main deck and the gooseneck.

14. The trailer of claim 12 wherein the lock pins pass through aligned openings in the inclined surfaces of the main deck frame members and in blocks within the C-shaped channel members, and the gooseneck includes lugs which project from the inclined surfaces of the gooseneck and pass through the openings in the inclined surfaces of the extension when the gooseneck is connected to the extension and through openings in the inclined surfaces of the main deck when the gooseneck is connected directly to the main deck.

15. The trailer of claim 12 wherein the C-shaped channel members are an integral part of the extension, and front portions of the frame members of the main deck are slidably received in the C-shaped channel members.

16. The trailer of claim 12 wherein the C-shaped channel members include upper and lower flanges which extend along the upper and lower sides of the frame members of the main deck, with bolts interconnecting the upper and lower flanges of the C-shaped channel members toward the rear of the C-shaped channel members to prevent twisting of the C-shaped channel members under load conditions.

17. The trailer of claim 12 wherein the coupling pins project in a forward direction from the frame members of the main deck, and the sockets in which the pins are slidably received are formed in blocks which extend between and are affixed to upper and lower flanges of the C-shaped channel members.

18. The trailer of claim 17 including blocks with downwardly and forwardly inclined lower surfaces extending between the upper flanges of the C-shaped channel members and the blocks in which the sockets are formed, with openings in the inclined blocks in registration with corresponding openings in inclined surfaces of the frame members of the main deck for receiving the lock pins.

19. The trailer of claim 17 wherein the lock pins depend from bases which are removably secured to the C-shaped channel members and also pass through openings in the upper flanges.

20. A deck extension for a trailer having an elongated main deck with longitudinally extending frame members on opposite sides thereof, ground engaging wheels toward the rear of the deck, and coupling pins extending in a forward direction from the frame members, comprising:
   upper and lower vertically spaced, longitudinally extending flanges on opposite sides of the extension,
   blocks extending between and affixed to the upper and lower flanges on each side of the extension,
   sockets formed in the blocks for receiving the coupling pins of the main deck in weight supporting relationship,
   webs extending along the longitudinal center lines of the flanges to form I-beams along the sides of the extension in front of the blocks,
   cross members extending between the I-beams, and
   webs extending along the outer sides of the flanges and to the rear of the blocks forming C-shaped channel members with the flanges for embracing the frame members of the trailer deck to prevent sagging under load in the connection between the main deck and the extension.

21. The deck extension of claim 20 including lock pins engagable with the frame members of the main deck to prevent longitudinal separation of the main deck and the extension.

22. The deck extension of claim 20 including bolts interconnecting the upper and lower flanges toward the rear of the C-shaped channel members to prevent twisting of the C-shaped channel members under load.

* * * * *